United States Patent
Jalili (10) Patent No.: US 9,773,126 B2
(45) Date of Patent: Sep. 26, 2017

(54) DATA COLLECTION PRIVACY

(71) Applicant: Adobe Systems Incorporated, San Jose, CA (US)

(72) Inventor: Reza Jalili, Sandy, UT (US)

(73) Assignee: Adobe Systems Incorporated, San Jose, CA (US)

( * ) Notice: Subject to any disclaimer, the term of this patent is extended or adjusted under 35 U.S.C. 154(b) by 184 days.

(21) Appl. No.: 14/029,397

(22) Filed: Sep. 17, 2013

(65) Prior Publication Data
US 2015/0082455 A1 Mar. 19, 2015

(51) Int. Cl.
*G06F 21/62* (2013.01)

(52) U.S. Cl.
CPC .................. *G06F 21/6263* (2013.01)

(58) Field of Classification Search
CPC ... H04L 67/02; H04L 12/585; H04L 12/5855; H04L 51/14; G06F 21/10; G06F 21/6263
USPC .......................................................... 726/27
See application file for complete search history.

(56) References Cited

U.S. PATENT DOCUMENTS

| | | | | |
|---|---|---|---|---|
| 8,166,406 B1* | 4/2012 | Goldfeder | ........... | G06F 21/6263 709/224 |
| 8,978,140 B2* | 3/2015 | Hubbard | ........... | G06F 17/30864 713/154 |
| 2002/0188572 A1* | 12/2002 | Bleizeffer | ........... | G06F 21/6218 705/64 |
| 2009/0254971 A1* | 10/2009 | Herz | ...................... | G06Q 10/10 726/1 |
| 2011/0283335 A1* | 11/2011 | Bussard | ............ | G06F 17/30684 726/1 |
| 2011/0314092 A1* | 12/2011 | Lunt | ................. | G06F 17/30876 709/203 |

* cited by examiner

*Primary Examiner* — Matthew Smithers
(74) *Attorney, Agent, or Firm* — Wolfe-SBMC (57) ABSTRACT

Various implementations of data collection privacy techniques for web content are described herein. Web content that is authored via content authoring service may be associated with data that describes collection behaviors of the web content in accordance with an established data collection privacy scheme. In one approach, data collection privacy is implemented using mark-up constructs contained in a manifest that is included with or otherwise associated with the web content. A content rendering application, such as a browser, may be configured to parse the content and recognize the collection behaviors based on the corresponding data indicative of the behaviors. The content rendering application may then output a notification to inform the user regarding the collection behaviors and provide a set of options available for management of data collection.

20 Claims, 7 Drawing Sheets

DATA COLLECTION PRIVACY

BACKGROUND

Individuals have increasing access to and make frequent use of web content available from service providers. Generally, web content is accessed over a network using a browser or other network-enabled client application. At least some web content may be configured to collect user data that is used to understand browsing habits, preferences, demographic information, and so forth for individual users. The collected data may enable providers to provide users with targeted and/or customized content, which may enhance the overall user experience. Using traditional techniques, click tracking and other data collection mechanisms may occur without user knowledge or consent. Users though may be uncomfortable with unchecked collection of data due to privacy concerns. This has led to development of countermeasures that may enable users to globally block data collection and tracking. Unfortunately, blocking all data collection makes it difficult or impossible for providers to customize content on an individual user basis, which detracts from the overall user experience.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Data collection privacy techniques for web content are described. In one or more implementations, web content that is authored via a content authoring service is associated with data that describes collection behaviors of the web content. Association of data indicative of collection behaviors with web content makes the content compliant with an established data collection privacy scheme. In one approach, the data is configured as mark-up constructs in a manifest that is included with the web content. A content rendering application, such as a browser, may be configured to parse the content and recognize the collection behaviors based on the corresponding data indicative of the behaviors. The content rendering application may then output a notification to inform a user regarding the collection behaviors and provide a set of options available for management of data collection. In this way, users are provided control over collection of user data and may make informed decisions regarding which data collectors/owners are trustworthy and whether to allow or block data collection.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Various implementations of data collection privacy techniques for web content are described herein. Web content that is authored via content authoring service may be associated with data that describes collection behaviors of the web content in accordance with an established data collection privacy scheme. In one approach, data collection privacy is implemented using mark-up constructs contained in a manifest that is included with or otherwise associated with the web content. A content rendering application, such as a browser, may be configured to parse the content and recognize the collection behaviors based on the corresponding data indicative of the behaviors. The content rendering application may then output a notification to inform the user regarding the collection behaviors and provide a set of options available for management of data collection.

The data collection privacy scheme described herein provides users with control over collection of user data and enables the user to make informed decisions regarding which data collectors/owners are trustworthy and whether to allow or block data collection. Further, developers may be able to selectively choose whether or not to author content that complies with the data collection privacy scheme. Developers may choose to create compliant content in order to produce content that is acceptable to users and reduces the chances that users will block the content. Informed users may appreciate the value of allowing collectors/owners to collect at least some kinds of data, which enables the providers to provide targeted user-specific content and customizations. Therefore, the data collection privacy techniques discussed herein may facilitate collection of user data in a way that satisfies privacy concerns of users and supplies the collectors/owners of user data with sufficient information to customize and enhance the user experience.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

Figure 1:
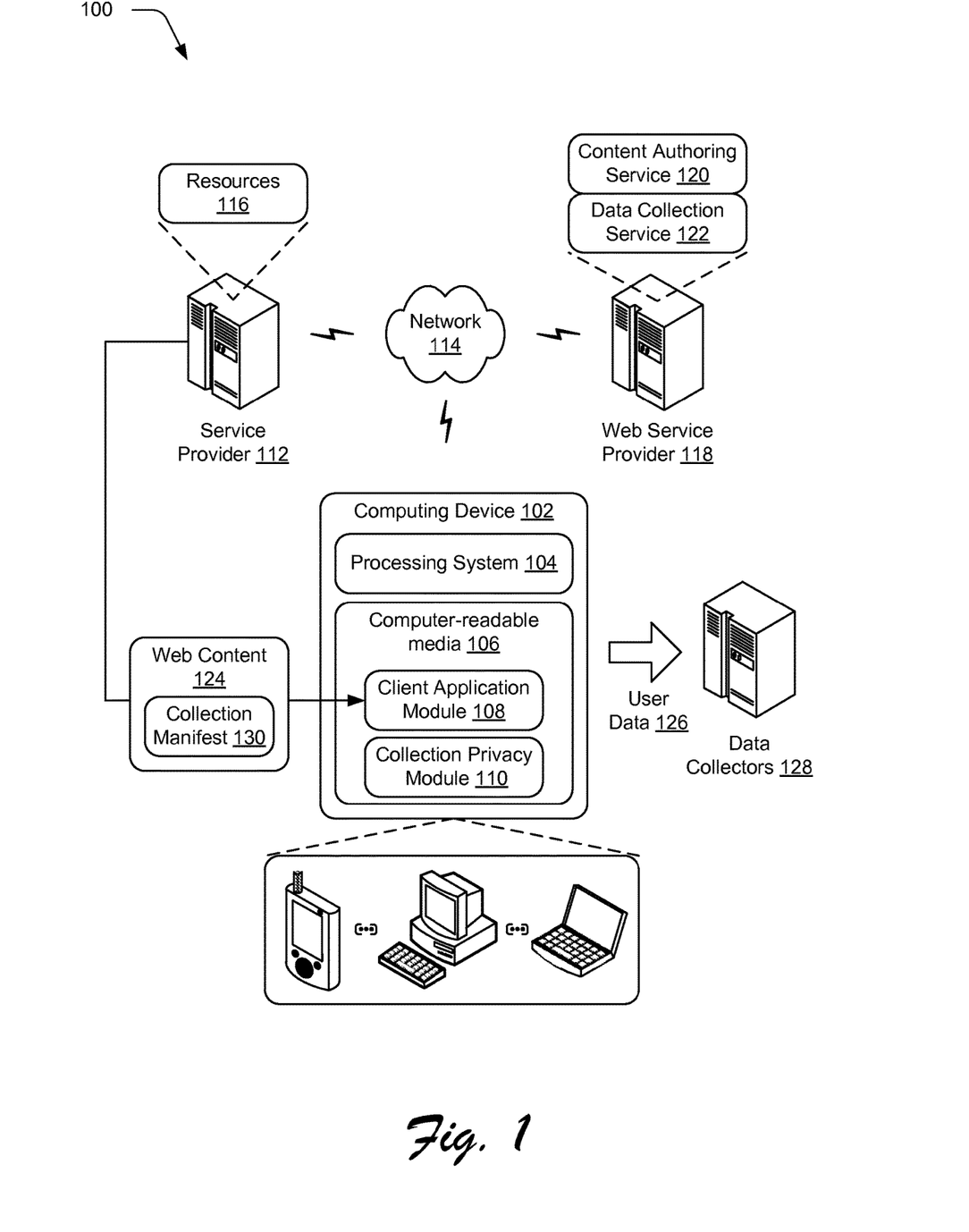
FIG. 1 is an illustration of an operating environment in an example implementation that is operable to employ techniques described herein.

FIG. 1 is an illustration of an environment 100 in an example implementation that is operable to employ techniques described herein. The illustrated environment 100 includes a computing device 102 including a processing system 104 that may include one or more processing devices, one or more computer-readable media 106 and a client application module 108 embodied on the computer-readable media 106 and operable via the processing system 104 to implement corresponding functionality described herein. In at least some embodiments, the client application module 108 may represent a browser of the computing device operable to access various kinds of web-based resources (e.g., content and services). The client application module 108 may also represent a client-side component having integrated functionality operable to access web-based resources (e.g., a network-enabled application), browse the Internet, interact with online providers, and so forth.

The computing device 102 may be configured as any suitable type of computing device. For example, the computing device may be configured as a desktop computer, a laptop computer, a mobile device (e.g., assuming a handheld configuration such as a tablet or mobile phone), a tablet, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 7.

The computing device 102 may also include or make use of a collection privacy module 110 that represents functionality operable to implement data collection privacy techniques in relation to web content that is accessed via the client application. The collection privacy module 110 may be further operable to facilitate management of data that is collected. By way of introduction, the collection privacy module 110 may be configured to provide notifications regarding data collection behaviors of web content encountered via the client application and expose options to manage data collection. The notifications may be configured to indicate at least the identity of entities that are involved with collecting data. If data is being collected by an entity on behalf of a third party owner, the third party owner may also be identified. Examples of options to manage data collection may include, but are not limited to, options to set a data collection agent, control notification settings, allow or block collections globally or with respect to individual collectors, manage data that is collected, view a collection history, and so forth. Details regarding these and other aspects of data collection privacy techniques are discussed in relation to the following figures.

The collection privacy module 110 may be implemented as a software module, a hardware device, or using a combination of software, hardware, firmware, fixed logic circuitry, etc. The collection privacy module 110 may be implemented as a standalone component of the computing device 102 as illustrated. In addition or alternatively, the collection privacy module 110 may be configured as an integrated component of the client application module 108, an operating system, or other device application. In an implementation, the collection privacy module 110 is configured as a plug-in for a browser or other client application module 108.

The operating environment 100 of FIG. 1 further depicts one or more service providers 112, configured to communicate with computing device 102 over a network 114, such as the Internet, to provide a "cloud-based" computing environment. Generally speaking, a service provider 112 is configured to make various resources 116 available over the network 114 to clients. In some scenarios, users may sign up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and/or content typically made available over a network by one or more providers. Some examples of services include, but are not limited to, a photo editing service, a web development and management service, a collaboration service, a social networking service, a messaging service, an advertisement service, and so forth. Content may include various combinations of text, video, ads, audio, multi-media streams, animations, images, web documents, web pages, applications, device applications, and the like.

Additionally, the operating environment 100 of FIG. 1 depicts a web service provider 118. The web service provider 118 is one particular example of a service provider 112 that may offer a suite of services, web applications, and other resources to clients. In the depicted example, the web service provider 118 is configured to implement at least a content authoring service 120 and a data collection service 122. Developers may employ the content authoring service 120 to create web content 124 that may be published and distributed to clients over a network in various ways. The content authoring service 120 is representative of various tools that may be employed by developer to create presentation, applications, web pages, documents, and other content. The authoring tools may be accessible over a network or may be deployed locally on a computing device as a desktop application. In an implementation, the content authoring service 120 facilities authoring of web content 124 that incorporates data collection privacy features and/or complies with formats, protocols, syntax, coding techniques, parameters, strings, and other constructs established to implement data collection privacy described herein. The data collection service 122 is representative of functionality accessible to clients to manage user data 126 that may be collected by various data collectors 128. For instance, the data collection service 122 may act as an agent on behalf of users to enable control over user data 126 and collection behaviors of data collectors 128. In an implementation, the data collection service 122 may also perform data collection on behalf of one or more data collectors 128. Accordingly, the data collection service 122 may operate as an intermediary between users and collectors to facilitate collection in a manner that both satisfies privacy concerns and supplies the collectors with sufficient information to customize and enhance the user experience in accordance with users' activities, behaviors, preferences, and privacy settings. Together, the content authoring service 120 and data collection service 122 provide infrastructure and techniques to implement a data collection privacy scheme/platform for centralized, cloud-based management of data collection by developers, users, and data collectors.

In operation, a browser (or other client application module 108) may be employed to access web content 124 that is published by a service provider 112 and accessible over a network 114. At least some of the web content 124 may be configured to collect user data 126 and/or perform tracking of some kind. In accordance with techniques discussed above and below, the web content 124 may be configured to enable features supported by way of a data collection privacy platform. For example, the web content 124 may be configured to include information sufficient to enable a client to recognize collection behavior and take responsive actions. A variety of different techniques and formats for inclusion of information regarding collection behaviors with web content are contemplated. In one approach, the content authoring service 120 is operable to produce a collection manifest 130 that is included with or otherwise associated with web content 124 as part of a content authoring process. The collection manifest 130 may be configured to encode collection behaviors of corresponding web content 124. When web content 124 is accessed and/or rendered by a client application module 108, the client may reference/parse the collection manifest 130 to detect and understand the collection behaviors of the content encoded therein, such as via a collection privacy module 110. The client may then take one or more actions for data collection privacy responsive to processing the manifest, such as outputting a notification, exposing options for managing data collection, and so forth.

Having considered an example environment, consider now a discussion of some example details of the techniques for data collection privacy in accordance with one or more implementations.

Data Collection Privacy Details

This section describes some example details of data collection privacy techniques in accordance with one or more implementations. Generally speaking, web content 124 may be adapted in accordance with techniques described herein to enable applications to recognize and act upon collection behaviors of the content. This may involve including indications encoded in the content regarding whether or not the content collects data, what if any data is collected, what entities are collecting the data, how the data is used, and so on. As noted above, information regarding collection behaviors of web content 124 may be associated with the web content 124 using a variety of different techniques and formats. For example, various code structures, protocols, and constructs may be defined to establish a data collection privacy scheme that designates standards for declaring collection behaviors within web content. Developers may then employ the standards defined by the data collection privacy scheme to author compliant content. Browsers and/or other client applications may be configured to recognize and handle compliant content to implement data collection privacy in accordance with the standards and/or user preferences/selections of management options. In addition, non-compliant content may be detected and appropriate action may be taken in response to the detection, such as outputting a notification, restricting or blocking the non-compliant content, presenting management options, and so forth Collection Manifest In one approach, a collection manifest 130 may be included with or otherwise associated with web content 124 as part of a content authoring process. The collection manifest 130 is representative of data sufficient to describe collection behaviors and corresponding management options associated with web content and convey this information to client applications. The collection manifest 130 may be structured using any suitable script, mark-up language code, parameters, strings, tags, objects, elements and/or other mark-up constructs. For example, the collection manifest 130 may be implemented using constructs contained within a XML, XHMTL, HTML, or other mark-up language document that defines the web content. Alternatively, the collection manifest may be configured as an external document associated with web content. The manifest may include various declarations to describe collection behaviors and corresponding management options. Such declaration may be provided as contiguous code in a header of a mark-up document or in a standalone document. The concept of the manifest as used herein also encompasses non-contiguous declarations. For example, declarations related to collection can be spread throughout a document in different portions of the text/mark-up. For instance, some declarations may be configured as attributes or properties on elements/objects defined by a document. In this case, the manifest includes the various declarations that are contained in or referenced at various locations throughout the document.

Figure 2:
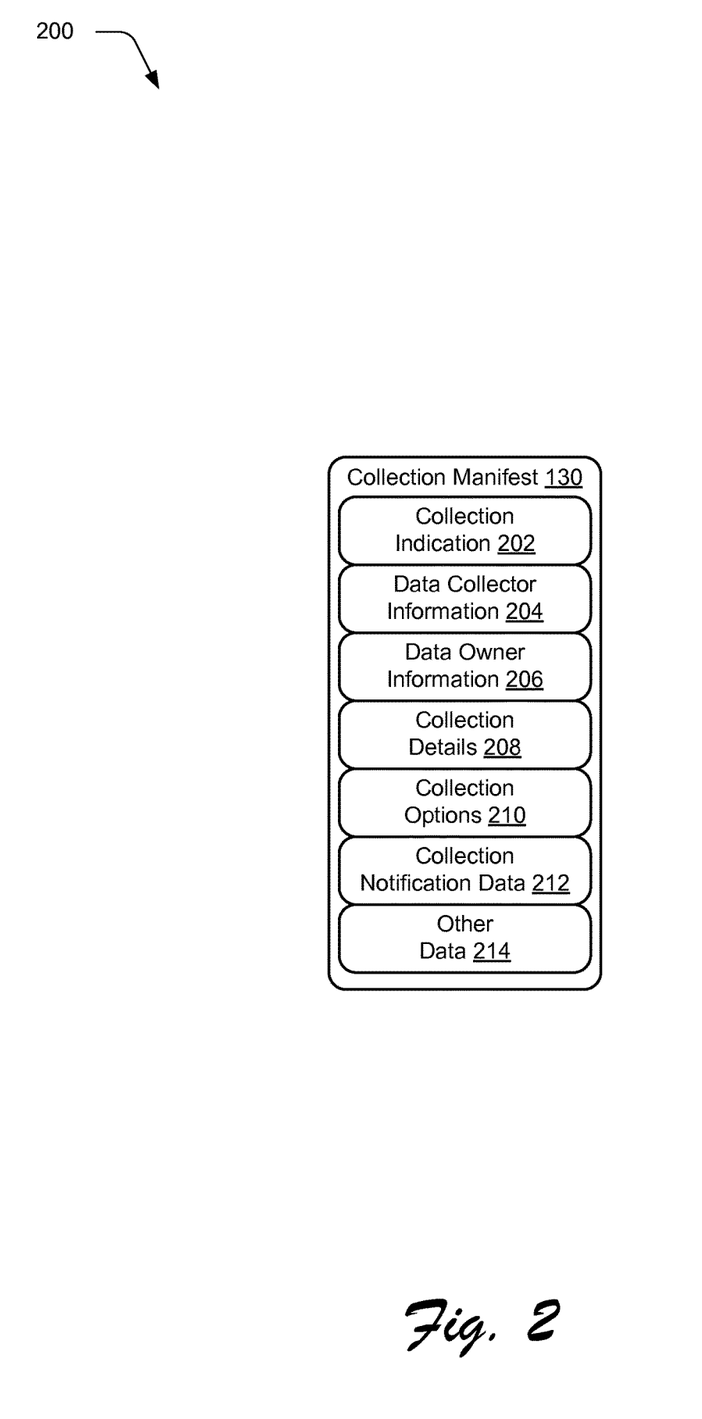
FIG. 2 illustrates an example collection manifest in accordance with one or more implementations.

By way of example and not limitation, FIG. 2 depicts generally at 200 one example arrangement of information for a collection manifest 130. In the depicted example, collection manifest 130 includes a collection indication 202, data collector information 204, and data owner information 206. The collection indication 202 indicates whether or not associated web content collects user data. The data collector information 204 provides at least the identity of an entity that collects data and may also include additional information such as a description, a URL of the entity, a trust assertion, and so forth. In some scenarios, the data collector may be a service that operates on behalf of a data owner that actually uses the data. Accordingly, the manifest may also include data owner information 206 to provide the identity of and information regarding the owner. The collection indication 202, data collector information 204, and data owner information 206 together provide a base level of information that may be employed by applications to recognize data collection actions of web content and notify users regarding the collection. The system may then take responsive action to manage data collection automatically, in accordance with user preferences, and/or as directed responsive to explicit user selections to control data collection.

A collection manifest 130 may optionally include additional information such as collection details 208 that describe what data is collected, how the data is used, privacy policies of the collector/owner, the scope of collection, and so forth; collection options 210 that indicate one or more management options provided by or supported by the web content; and collection notification data 212 that may be employed by applications to configure a notification regarding data collection, such as a logo or other image, entity descriptions, a trust assertion, links, and/or URLs to name a few examples. A variety of other data 214 suitable to describe, enable recognition of, and facilitate management of data collected by web content is also contemplated. For example, other data 214 may include but is not limited to data regarding collection history/statistics, user account settings and/or links to a user account page, data to assist a user in choosing a service to act as a data collection agent, and so forth.

Example Procedures

This section describes example procedures for data collection privacy in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some embodiments the procedures may be performed by a suitably configured device, such as the example computing device 102 of FIG. 1 that makes use of a collection privacy module 110 and/or one or more server computing devices that implement a data collection service 122.

Figure 3:
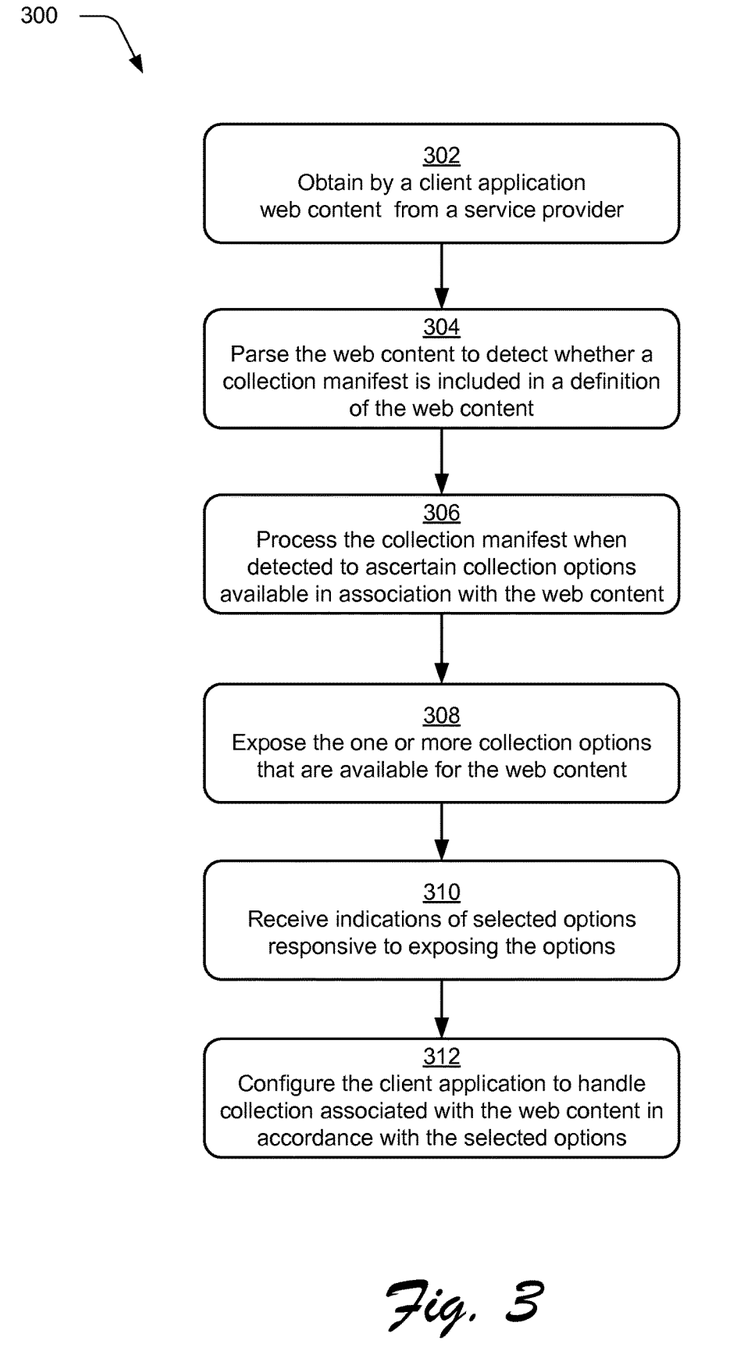
FIG. 3 is a flow diagram depicting an example procedure in accordance with one or more implementations.

FIG. 3 depicts an example procedure 300 in which a collection manifest in used to implement data collection privacy. Web content is obtained by a client application from a service provider (block 302) and the web content is parsed to detect whether a collection manifest is included in a definition of the web content (block 304). For example, an application of a computing device 102 may access and download content for rendering over a network 114 from various service providers 112. The application may include or make use of a collection privacy module 110 configured to manage privacy with respect to collection behavior of content. In some cases, the collection privacy module 110 is configured to recognize and process a collection manifest 130 that may be associated with accessed content. The collection manifest 130 provides a mechanism for developers to declare collection behaviors and comply with an established data collection privacy scheme as described herein. In general, the data collection privacy scheme enables applications and users to be notified regarding collection activities and to make informed decisions on how to respond. The collection privacy module 110 may be configured to parse the manifest and recognize tags, fields, elements and/or other constructs that are indicative of various different types of information associated with data collection and privacy as discussed in relation to the example manifest of FIG. 2. The collection privacy module 110 may make use of this information to facilitate management of data collection, notify users regarding collection, provide various privacy options, and so forth.

In particular, the collection manifest is processed when detected to ascertain collection options available in association with the web content (block 306). One or more collection options that are available for the web content are exposed (block 308). Indications of selected options are received responsive to exposing the options (block 310) and the client application is configured to handle collection associated with the web content in accordance with the selected options (block 312). The available options may be based at least in part upon information that is contained in the manifest, such as the identity of the owner or collector, the type of information collected, a trust level associated with the content, and so forth. In addition or alternatively, a notification may be generated and output to notify a user regarding details of the collection behavior of the content as described via the collection manifest.

The collection privacy module 110 may distinguish between compliant and non-compliant content based upon whether or not the content is associated with a manifest or a comparable data structure to implement techniques describe herein. Compliant and non-compliant content may then be handled in different ways based upon configurable settings. Options associated with web content may enable users to view and change settings that control how to handle data collection. In the absence of user selection of options and configuration of settings, default setting for the system may be applied.

Compliant content may include an indication in a designated format regarding whether or not data is collected. If an indication that data is not collected is made in a proper form, then collection privacy module 110 may recognize this and allow rendering of the content without substantial interference. On the other hand, if the indication denotes that some data is collected, the collection privacy module 110 may perform processing to determine details regarding collection behaviors (e.g., collector, owner, data collected, etc.) and collection options available in association with the web content. Content that is not associated with a manifest or other suitable indication in an appropriate form may be considered non-compliant content that does not adhere to the collection privacy scheme. Non-compliant content may be blocked from collecting user data and/or a notice may be generated to indicate that content is non-compliant in accordance with associated setting for handling non-compliant content.

In general, various options may be made available for management of data collection. The options may be configured as links to pages, selectable controls, menu items, buttons, lists, or other suitable user interface elements or instrumentalities associated an application and/or web content rendered by the application. Options may be included as part of a collection notification, a settings page/interface, a user interface menu, per application settings, system settings (e.g., global settings), or otherwise. For example, a notification output regarding data collection may be configured to include links to websites and/or services associated with data collectors and/or owners. An option selectable to access and view a history of collected information may also be made available. In connection with the history, options may be available to erase some or all of the collected data, recall data from some entities, block access to collected data, obtain reports, view reports, and otherwise manage the collected user data 126.

Further, options may be configured to enable management of access control lists (e.g., whitelist and/or blacklist) configured to specify/control entities that are allowed to collect user data and entities prevented from collecting user data. In addition or alternatively, the access control lists may designate types of information approved/disapproved for collection. For example, users may be able make explicit selections to permit some entities to collect data and block other entities via access control lists. Thus, users may approve some kinds of user data (e.g., anonymous click tracking, age, location, gender, etc.) and block collection of sensitive user data (e.g., user name, address, phone number, etc.). Settings options for management of access control lists may provide a variety of different categories and grouping for types of collectable user data for which a user may make selections to enable or disable collection.

Additionally, the data collection privacy scheme may facilitate selection of a designated collection agent through corresponding options. In this approach, user may be able to choose from among multiple entities available to act as agents on behalf of clients for data collection. The collection agent selected may be an entity that the user considers trustworthy and/or that is certified to adhere to privacy policies established for the data collection privacy scheme. The collection agent that is selected may implement a data collection service 122 that acts as an intermediary between the user and data collectors 128 to facilitate collection in a manner that both satisfies privacy concerns and supplies the collectors with sufficient information to customize and enhance the user experience in accordance with users' activities, behaviors, preferences, and privacy settings. Accordingly, collection privacy options exposed in connection with web content may include options to select, change, manage, and otherwise interact with a designated collection agent.

Other options associated with data collection privacy techniques are also contemplated. For example, collection privacy options may enable a user to adjust settings for notifications, control the way in which compliant and/or non-compliant is handled, view privacy settings, set a privacy level from a list or a scale of available levels each associated with a corresponding group of pre-established settings, and/or restore default settings, to name a few further options.

Figure 4:
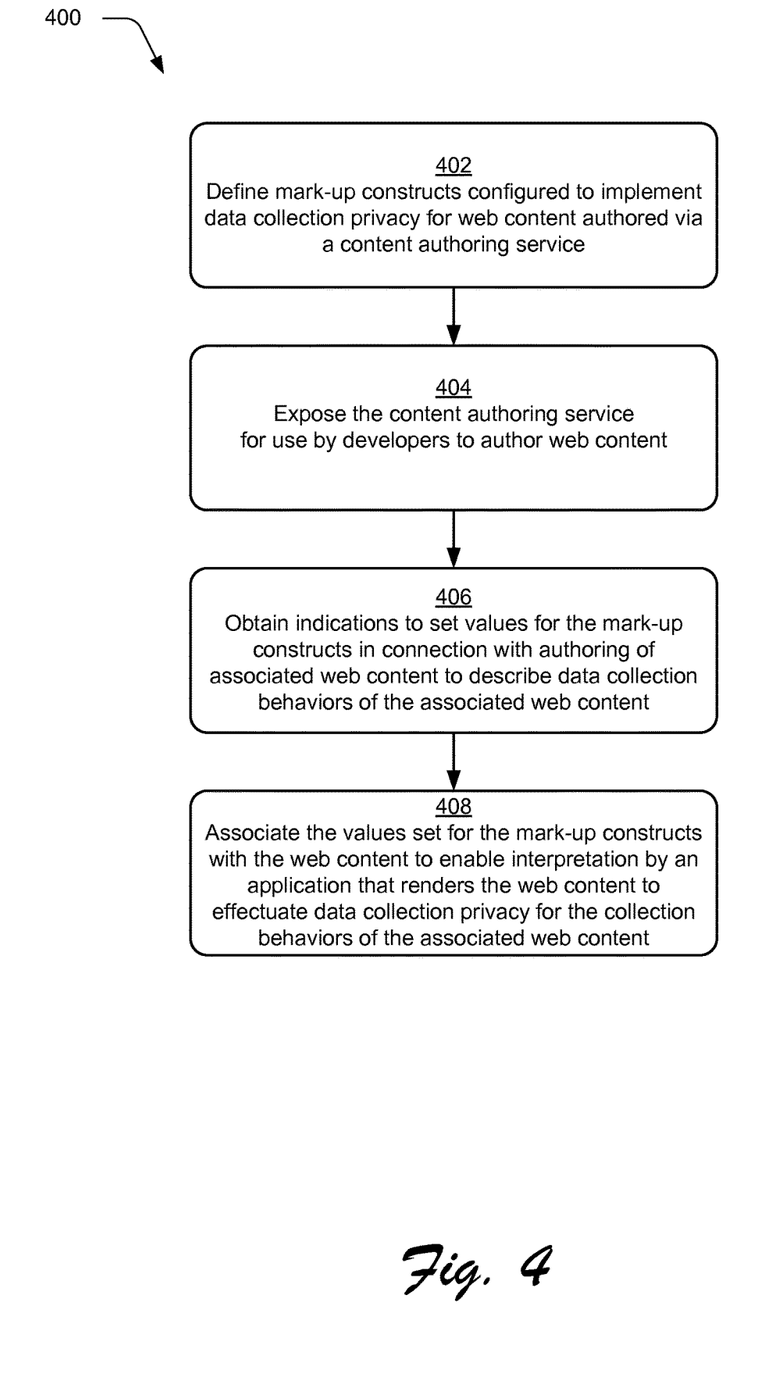
FIG. 4 is another flow diagram depicting an example procedure in accordance with one or more implementations.

FIG. 4 depicts an example procedure 400 in which an authoring service enables association of a manifest with web content to control collection behaviors of the content. Mark-up constructs are defined to implement data collection privacy for web content authored via a content authoring service (block 402) and the content authoring service is exposed for use by developers to author web content (block 404). For example, a web service provider 120 may expose a content authoring service 120 that facilitates content development. The content authoring service 120 may implement a data collection privacy scheme by way of various mark-up constructs that may be included with and/or associated with content that is authored via the service. The mark-up constructs define formats, syntax, and structure for specifying collection behaviors in relation to authored content. Various constructs to declare collection behaviors and corresponding information are contemplated as discussed previously herein.

Indications are obtained to set values for the mark-up constructs in connection with authoring of associated content to describe data collection behavior of the associated web content (block 406). Then, the values set for the mark-up constructs are associated with web content to enable interpretation by an application that renders the web content to effectuate data collection privacy for the collection behaviors of the associated web content (block 408). For example, a developer may interact with the content authoring service 120 to author content. The content authoring process may include selectable options to define and declare collection behaviors using appropriate constructs. To declare collection behaviors, the developer may specify values for various constructs in an established format that is recognizable by a content rendering application such as web browsers and other web enabled applications. The constructs may be, but need not be, configured as part of a manifest that is embedded with, linked to, or otherwise associated with corresponding web content. Thus, in some implementations the content authoring process may involve production of a collection manifest that includes values set for different mark-up constructs. The manifest may be configured to include mark-up constructs and corresponding values. Content rendering applications may be configured to interpret the mark-up constructs via a collection privacy module 110 or comparable functionality. This enables the content rendering applications to detect collection behaviors associated with web content and respond in various ways described herein to effectuate data collection privacy for the collection behavior of the associated web content.

In this way, developers may be able to selectively choose whether or not to author content that complies with an overall data collection privacy scheme. Developers may choose to create compliant content in order to make content that is acceptable to users and reduce the chances that users will block the content. Informed users may appreciate the value of allowing collectors/owners to collect at least some data, which enables the providers to provide targeted user-specific content and customizations. Thus, informed users that are given control over collection practice of web content may be receptive to some data collection in order to receive a customized and dynamic user experience, targeted offers the user is interested, and so forth. Additionally, collection of data by other entities may be acceptable to users if the users are able to choose a trusted agent to perform and manage data collection on their behalf as described herein. Therefore, the data collection privacy techniques discussed herein may facilitate collection of user data in a way that satisfies privacy concerns of user and supplies the collectors with sufficient information to customize and enhance the user experience.

Example User Interfaces

Figure 5:
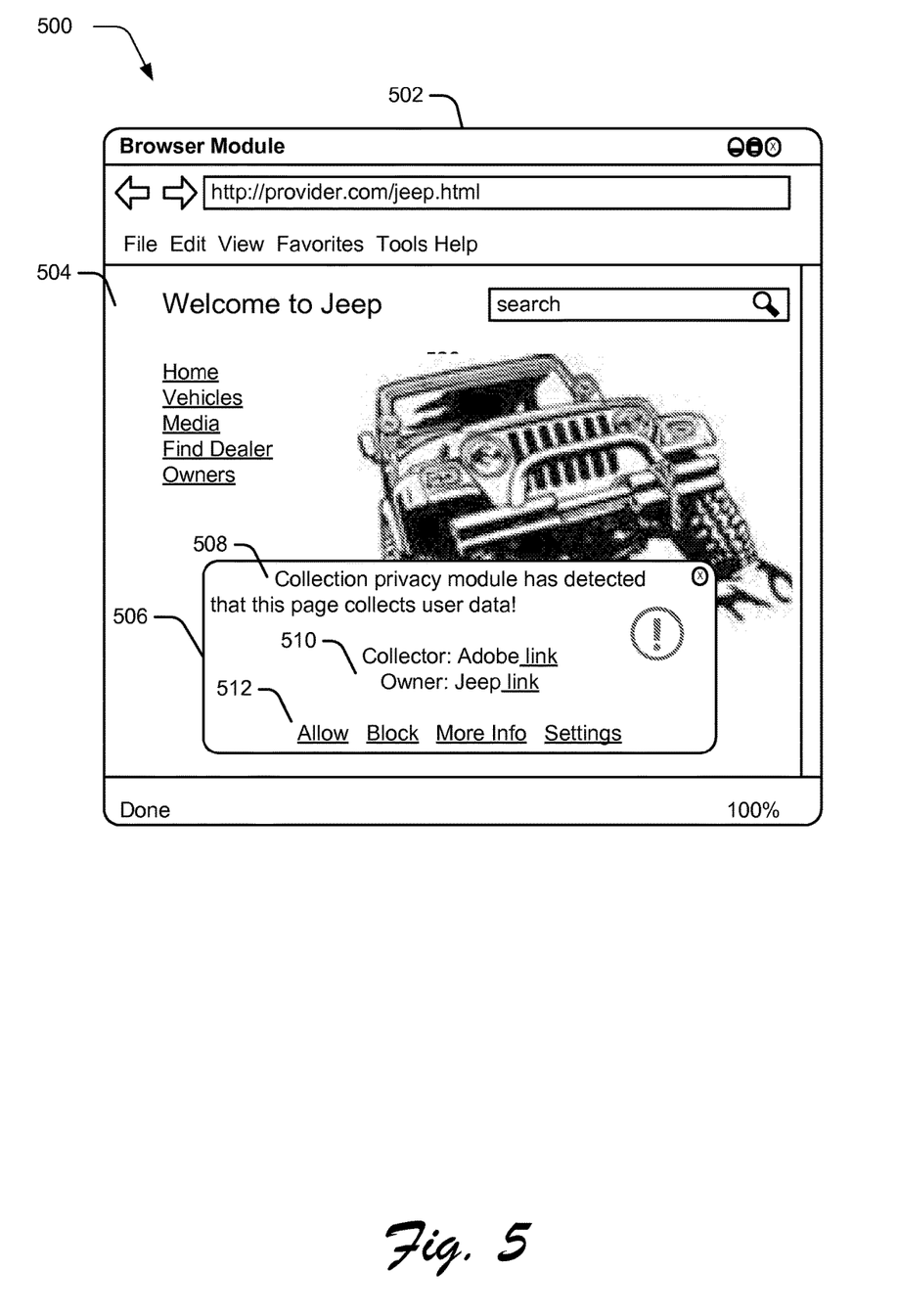
FIG. 5 depicts an example user interface having an example collection notification in accordance with one or more implementations.
Figure 6:
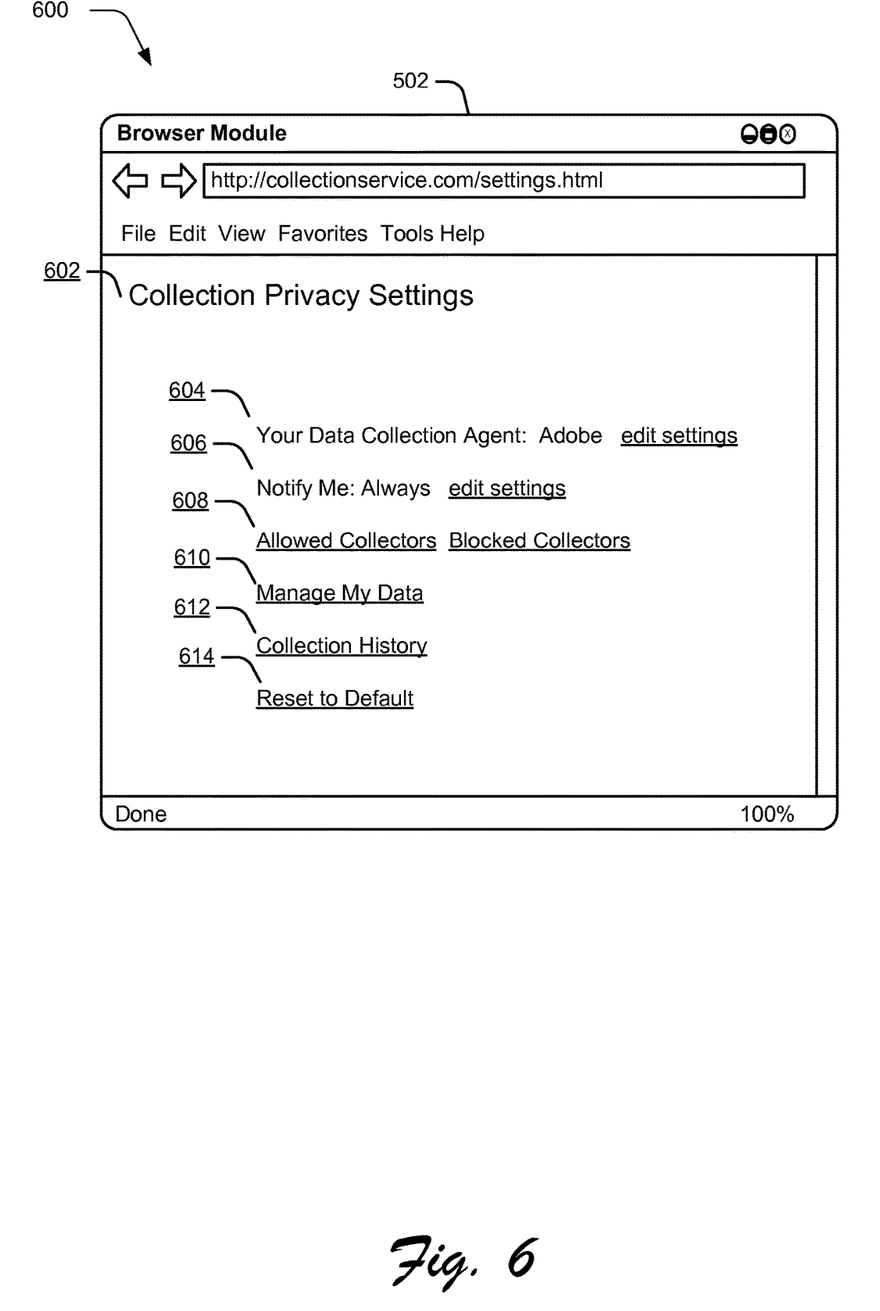
FIG. 6 depicts an example user interface having an example page for managing data collection privacy settings in accordance with one or more implementations.

Additional details regarding data collection privacy tools are discussed in relation to the example user interfaces of FIGS. 5 and 6. In particular, FIG. 5 depicts generally at 500 an example user interface having an example collection privacy notification in accordance with one or more embodiments. In this example, a user interface 502 is shown that corresponds to a browser. The browser has been navigated to access web content from a service provider, which in this case is a page for a vehicle manufacturer. The page is depicted as being rendered in a content rendering portion 504 of the user interface 502. A collection privacy notification 506 may be output responsive to detection of collection behavior associated with the web content. The detection may be made based upon mark-up constructs and/or a collection manifest 130 that is associated with the content. The collection privacy notification 506 may include an alert message 508 and identification information 510 to identify a collector and/or an owner associated with the web content. As shown, links to additional information regarding the collector/owner may also be included, such as a link to corresponding website or settings pages associated with the collector/owner. The collection privacy notification 506 may also be configured to expose various collection options 512 available for the web content as discussed herein. The collection options 512 may be derived based in part upon the mark-up constructs and/or a collection manifest 130 that is associated with the web content. Example options represented in FIG. 5 include options selectable to allow collection by the page, block collection, access more information, and navigate to a settings page for data collection privacy. A variety of other kinds of options are also contemplated that may be provided by way of links, buttons, menu items, or other user interface instrumentalities. The options may be incorporated with a collection privacy notification 506 as shown or may otherwise be made available via the user interface 502. For example, options may be exposed as menu item (such as via the depicted "Tools" menu), via a side bar element of the browser/application, or via a separate options page, to name a few additional non-limiting examples.

FIG. 6 depicts generally at 600 an example user interface having an example data collection privacy settings page in accordance with one or more implementations. In this example, a user interface 502 for the browser is depicted as being navigated to the data collection privacy settings page 602. Here, the settings page may be associated with a data collection service 122 and/or a selected data collection agent. Alternatively, comparable settings may be made available locally via a collection privacy module 110 and/or a corresponding client application module 108. In some scenarios the settings page may be accessed via an option provided via a collection privacy notification 506, such as via the example "Settings" options shown in FIG. 5. The settings page may also be accessible via the "Tools" menu or other navigation controls/links provided by the browser/application.

The data collection privacy settings page 602 represents, by way of example and not limitation, various example settings for data collection privacy that a user may be given control over in accordance with a data collection privacy scheme described herein. For instance, the data collection privacy settings page 602 may include information and controls for review, change, and otherwise manage settings for designating a data collection privacy agent 604, modify notification settings 606, configure access control lists 608 to set entities that are allowed and blocked with respect to data collection, manage collected data 610, view and interact with a collection history 612, and reset privacy settings to default selections 614. Naturally, a variety other settings may be included as part of a data collection privacy settings page 602 in addition to, in lieu of, and/or in various combinations with the illustrative examples of FIG. 6.

Having described example details in accordance with one or more implementations, consider now an example system and device that can be utilized to implement the various techniques described herein.

Example System and Device

Figure 7:
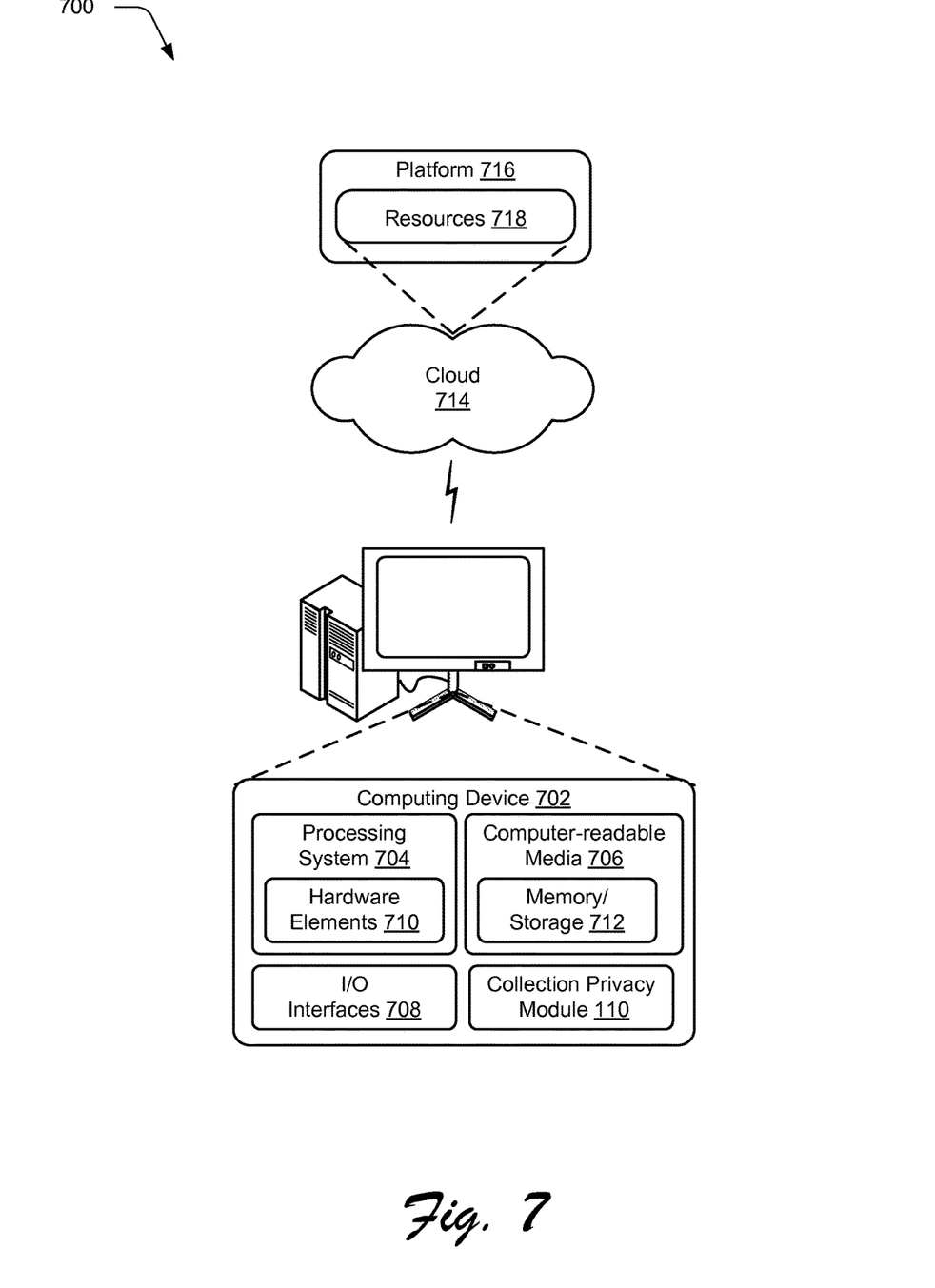
FIG. 7 illustrates an example system including various components of an example device that can be employed for one or more implementations of data collection privacy techniques described herein.

FIG. 7 illustrates an example system generally at 700 that includes an example computing device 702 that is representative of one or more computing systems and/or devices that may implement the various techniques described herein. This is illustrated through inclusion of the collection privacy module 110, which operates as described above. The computing device 702 may be, for example, a server of a service provider, a device associated with a client (e.g., a client device), an on-chip system, and/or any other suitable computing device or computing system.

The example computing device 702 is illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may comprise semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device to implement a data collection privacy scheme in connection with development of web content, the method comprising:
   obtaining by a client application web content from a service provider;
   detecting a collection manifest included with the web content that contains data instructing the client application regarding how to handle declarations for collecting user data that are made in the web content according to the data collection privacy scheme, the instructing including specifying encoded collection options for declared collection behaviors corresponding to the web content;
   recognizing, by the client application, data collection behaviors declared in the web content according to the data collection privacy scheme by referring to the manifest;
   processing the collection manifest to ascertain collection options encoded for the collection behaviors declared in the web content; and
   controlling via the client application collection of the user data by the web content in accordance with the encoded collection options.

2. A method as described in claim 1, further comprising:
   determining based on processing of the collection manifest that the web content is configured to collect at least some user data; and
   generating a notification configured to inform the user regarding collection of the user data by the web content.

3. A method as described in claim 2, wherein the notification is configured to identify at least one of an entity that performs the collection of the user data or an owner of the user data that is collected.

4. A method as described in claim 2, wherein at least one of the encoded collection options are exposed via the notification.

5. A method as described in claim 1, wherein the collection manifest is configured to include values for mark-up constructs that define the declarations for the declared collection behaviors in accordance with the data collection privacy scheme.

6. A method as described in claim 1, wherein the collection manifest is configured to include an indication regarding whether or not the web content collects the user data, information regarding entities that collect the user data, and entities that use the user data that is collected.

7. A method as described in claim 1, wherein the encoded collection options include an option to designate a collection agent to handle data collections on behalf of the user.

8. A method as described in claim 1, wherein the encoded collection options include an option to manage access control lists configured to control entities that are allowed to collect user data and entities prevented from collecting user data.

9. A method as described in claim 1, wherein the encoded collection options include options to allow or block collection of the user data by the web content.

10. A method as described in claim 1, wherein controlling the collection of the user data by the web content comprises:
receiving indications of selected options responsive to exposing one or more of the encoded collection options; and
configuring the client application to handle the web content in accordance with the selected options.

11. A method as described in claim 1, further comprising:
detecting that a collection manifest is not associated with different web content; and
blocking collection of user data by the different web content responsive to the detecting.

12. A method as described in claim 1, wherein the client application comprises a web browser.

13. One or more computer-readable storage media storing instructions that, responsive to execution by a computing device, cause the computing device to implement a collection privacy module to perform operations to implement a data collection privacy scheme in connection with development of web content, the operations including:
detecting whether web content rendered by a browser is configured to collect user data based upon a collection indication associated with the web content in accordance with a data collection privacy scheme, including detecting whether a collection manifest instructing client applications how to handle the collection indication is delivered with the web content, the delivery of a collection manifest with the web content indicating compliance of the web content with the data collection privacy scheme, and wherein a declaration corresponding to the collection indication is included in the manifest, the declaration when declared in the web content enabling the collection privacy module to recognize that the collection indication complies with the data collection privacy scheme; and
responsive to detecting that the web content rendered by the browser is configured to collect user data, outputting a notification configured to:
indicate that the web content is configured to collect user data;
identify an entity responsible for collection of the user data; and
provide one or more collection options to enable selectable control over collection behaviors of the web content; and
controlling the web content to restrict collection of user data in accordance with selections obtained through interaction with the one or more collection options.

14. One or more computer-readable storage media as recited in claim 13, wherein the declaration corresponding to the collection indication is configured as an element of the collection manifest, the collection manifest being associated with the web content to describe the collection behaviors of the web content in accordance with the data collection privacy scheme.

15. One or more computer-readable storage media as recited in claim 13, wherein the one or more collection options include one or more of:
an option to designate a collection agent;
an option to access history of collected user data;
an option to manage access control lists configured to control entities that are allowed to collect user data and entities blocked from collecting user data; or
an option to navigate to a page configured for management of data collection privacy settings.

16. One or more computer-readable storage media as recited in claim 13, wherein the collection privacy module is configured as a plug-in for the browser.

17. A computing system comprising:
processing hardware;
one or more computer readable media storing instructions executable via the processing hardware to perform operations to implement a data collection privacy scheme in connection with development of web content, the operations comprising:
defining mark-up constructs configured to implement data collection privacy according to the data collection privacy scheme for web content authored via a content authoring service;
exposing the content authoring service for use by developers to author web content;
obtaining, via a user interface of the content authoring service, indications to set values for the mark-up constructs in connection with authoring of associated web content to describe data collection behaviors of the associated web content;
associating the values set for the mark-up constructs with the web content to enable interpretation by an application that renders the web content to effectuate data collection privacy based on recognition that the collection behaviors of the associated web content comply with the data collection privacy scheme; and
delivering the mark-up constructs as integrated portions of the web content for use by the application that renders the web content to recognize the data collection behaviors of the associated web content and take control actions to restrict collection of user data by the web content.

18. The computing device as described in claim 17, wherein associating the values set for the mark-up constructs with the web content comprises producing a collection manifest configured to describe the data collection behaviors and collection options available in connection with the associated web content, the collection manifest including the mark-up constructs and corresponding values set for the mark-up constructs.

19. The computing device as described in claim 18, wherein the collection manifest comprises mark-up language code contained in a mark-up language document that defines the associated web content.

20. The computing device as described in claim 17, wherein the mark-up constructs are configured to define formats, syntax, and structure for specifying collection behaviors in relation to web content that is authored via the content authoring service.

* * * * *